United States Patent
Yao et al.

(10) Patent No.: US 9,407,183 B2
(45) Date of Patent: Aug. 2, 2016

(54) SIGNAL CONTROL SYSTEM FOR FAN MOTOR

(71) Applicant: Asia Vital Components (China) Co., Ltd., Shenzhen (CN)

(72) Inventors: Bao-Lin Yao, Shenzhen (CN); Hu Zhang, Shenzhen (CN)

(73) Assignee: Asia Vital Components (China) Co., Ltd., Shenzhen (CN)

( * ) Notice: Subject to any disclaimer, the term of this patent is extended or adjusted under 35 U.S.C. 154(b) by 54 days.

(21) Appl. No.: 14/555,710

(22) Filed: Nov. 28, 2014

(65) Prior Publication Data

US 2016/0156296 A1    Jun. 2, 2016

(51) Int. Cl.
*H02P 5/00* (2016.01)
*H02P 7/06* (2006.01)

(52) U.S. Cl.
CPC ........................................ *H02P 7/06* (2013.01)

(58) Field of Classification Search
CPC .................................. H02K 17/08; H02P 1/28
USPC .......... 318/400.01, 3, 55, 59, 66, 68, 69, 163,
318/779, 799, 257, 268, 400.14, 400.15,
318/721, 722, 400.37, 400.38, 400.32,
318/400.4, 400.26, 400.28; 123/339.18,
123/687, 441, 339.1; 310/19; 361/679.48,
361/695; 454/15
See application file for complete search history.

(56) References Cited

U.S. PATENT DOCUMENTS

| | | | | |
|---|---|---|---|---|
| 7,091,689 B2* | 8/2006 | Lee | .................... | H02K 11/0047 318/268 |
| 7,550,936 B2* | 6/2009 | Kurita | ........................ | H02P 5/74 318/255 |
| 8,354,814 B2* | 1/2013 | Yang | .......................... | H02P 1/18 318/400.21 |
| 2011/0254490 A1* | 10/2011 | Horng | ................... | H02P 29/022 318/400.26 |

* cited by examiner

*Primary Examiner* — Antony M Paul
(74) *Attorney, Agent, or Firm* — C. G. Mersereau; Nikolai & Mersereau, P.A.

(57) ABSTRACT

A signal control system for a fan motor comprises an input end, a load driving unit, a first signal conversion unit, a second signal conversion unit, and an amplifying driving unit. A rotation speed signal is transmitted from the input end to the load driving unit. The first and the second signal conversion units are electrically connected to the load driving unit and receive the rotation speed signal. The amplifying driving unit is electrically connected to the first and the second signal conversion units to generate an operation signal. Thus, the received rotation speed signal is converted to the operation signal through the signal control system for the fan motor, achieving the effects of cost reduction, simplification, and convenience.

7 Claims, 2 Drawing Sheets

SIGNAL CONTROL SYSTEM FOR FAN MOTOR

BACKGROUND OF THE INVENTION

1. Field of the Invention

The present invention relates to a signal control system for a fan motor and, in particular, to a signal control system for a fan motor which can converts a rotation speed signal to an operation signal and then avoids high cost.

2. Description of Prior Art

With the development of recent electronic industry and functional improvement of electronic components, their operational speeds and the amounts of chips inside increase accordingly. When the above-mentioned chips operate, the heat generated also increases. If this heat source cannot be dissipated immediately, the functions of these electronic components will be significantly affected and the processing speed of these electronic components will be decreased. When the heat generated is continuously accumulated, the electronic components will burn out. Therefore, how to dissipate the heat is one of the most important issues of electronic components and a heat-dissipation fan as a heat-dissipation apparatus is a common way.

It is quite common to use the heat-dissipation fan in various fields such as computers, electronic communication, or server equipment. The ordinary fans used in electronic communication or server equipment are in operate in series or in parallel to effectively improve efficiency of heat dissipation. Moreover, the general signal waveforms used in the general heat-dissipation fans are mainly divided into the sinusoidal square wave and the high-low voltage wave (RD). The sinusoidal square wave (FG) is mainly used to detect the rotation speed status of the fan, which is also called the rotation speed signal (FG). The output of the rotation speed signal is obtained by reading the switching number of the fan magnetic field through the system to calculate the fan rotation speed. The high-low voltage wave is mainly used as an output signal which indicates that the fan is rotating or stops. The output of the high-low voltage wave, also called the operation signal (RD), is obtained by outputting a HI voltage level through the system after the fan stops and the magnetic field switches to further determine if the fan rotates normally. For a general fan system, after the rotation speed signal is inputted into the system, only the rotation speed signal (FG) can be outputted and the operation signal (RD) cannot be outputted. The function of signal output of such a system cannot meet the requirements of the current fan system. If the operation signal is required to be outputted from the system, a microprocessor (MCU) is needed to perform the signal conversion. In this way, the rotation speed signal inputted can be converted into the operation signal. As a result, a higher cost is incurred by the installation of the MCU; a circuit design is performed by combing an MCU and a complicated circuit or a controller, which results in a relatively high cost and a complicated design.

Therefore, how to overcome the above problems and disadvantages of the prior art is the focus which the inventor and the related manufacturers in this industry have been devoting themselves to.

SUMMARY OF THE INVENTION

Thus, to effectively overcome the above problems, the main objective of the present invention is to provide a signal control system for a fan motor, which can convert a rotation speed signal into an operation signal and avoids high cost To achieve the above objective, the present invention provides a signal control system for a fan motor, which comprises an input end, a load driving unit, a first signal conversion unit, a second signal conversion unit, and an amplifying driving unit. The input end is used for input of a rotation speed signal. The first signal conversion unit is electrically connected to the load driving unit and receives the rotation speed signal. The second signal conversion unit is electrically connected to the load driving unit and receives the rotation speed signal. The amplifying driving unit is electrically connected to the first signal conversion unit and the second signal conversion unit to generate an operation signal. Thus, the received rotation speed signal is converted to the operation signal through the signal control system for the fan motor, achieving the effects of cost reduction, simplification, and convenience.

DETAILED DESCRIPTION OF THE INVENTION

The above objectives of the present invention and the features of structure and function of the present invention are described according to the preferred embodiments in accompanying figures.

Figure 1:
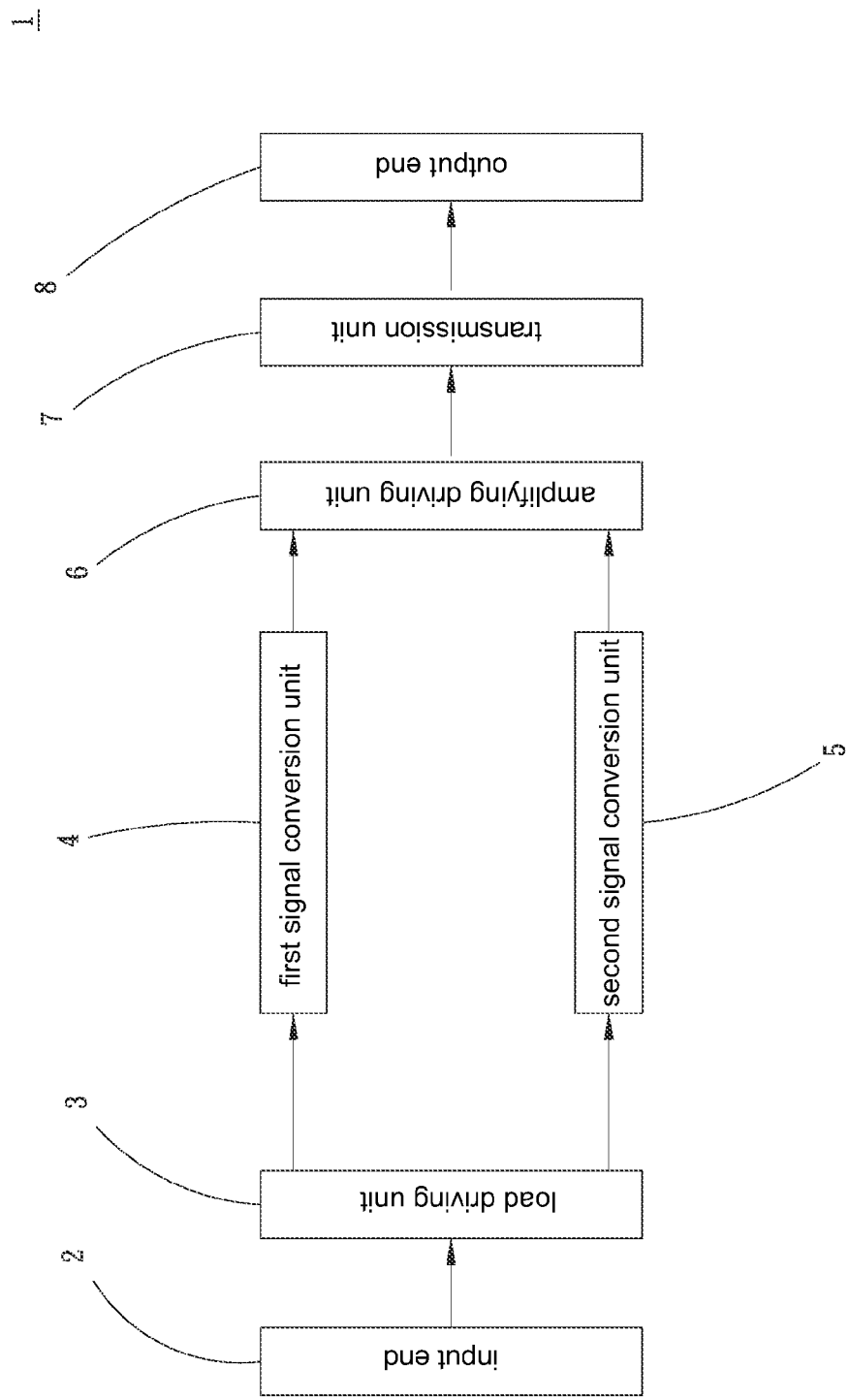
FIG. 1 is a block schematic view of a preferred embodiment of the present invention.
Figure 2:
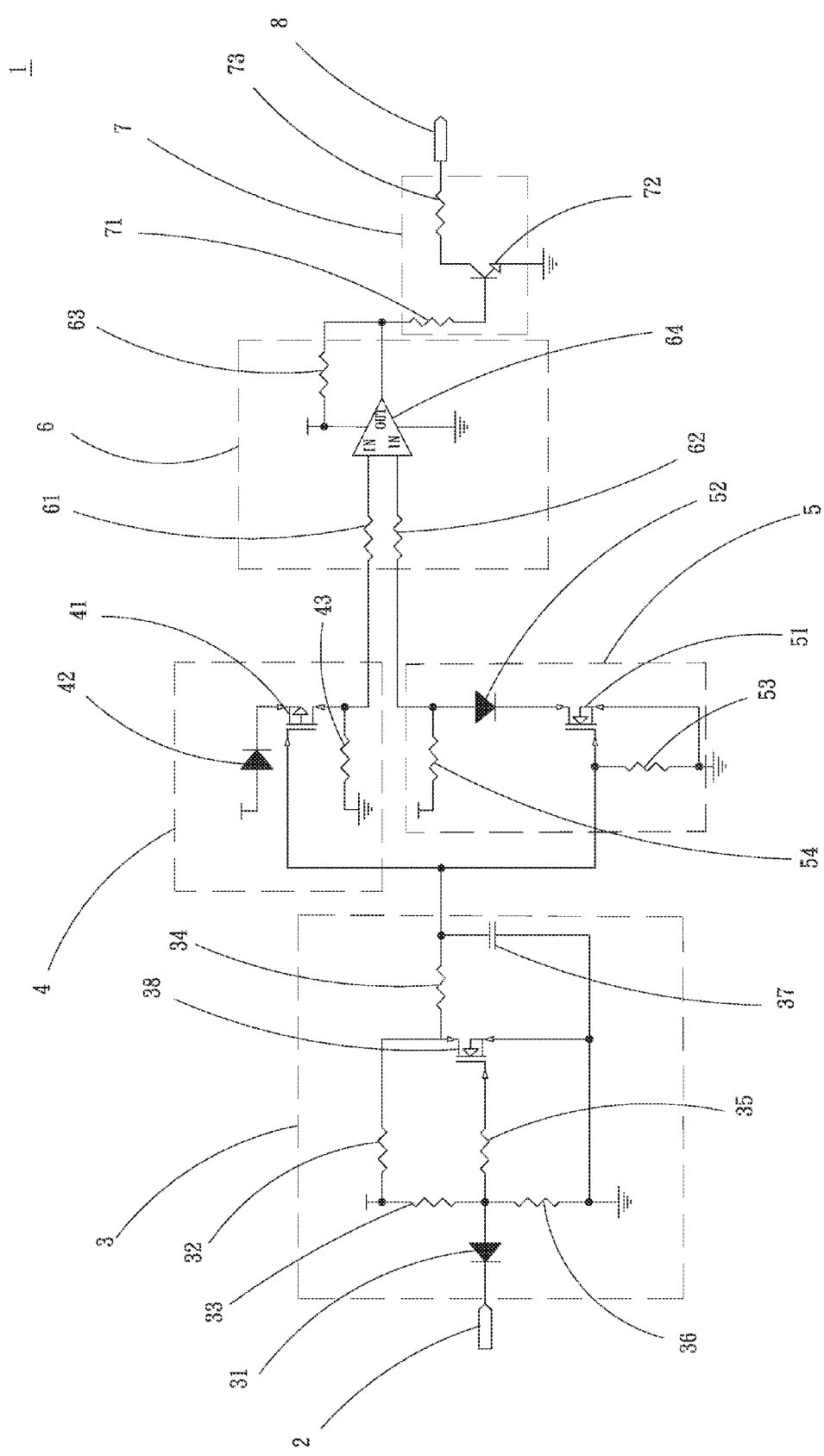
FIG. 2 is a circuit schematic of a preferred embodiment of the present invention.

The present invention provides a signal control system 1 for a fan motor, as shown in FIGS. 1 and 2, which are a block schematic view and a circuit schematic of a preferred embodiment of the present invention, respectively. The signal control system 1 for the fan motor comprises an input end 2, a load driving unit 3, a first signal conversion unit 4, a second signal conversion unit 5, and an amplifying driving unit 6.

The input end 2 is used for input of a rotation speed signal which is a fan rotation speed signal (FG). The input end 2 is connected to the load driving unit 3 which receives the rotation speed signal. The load driving unit 3 is electrically connected to the first signal conversion unit 4 and the second signal conversion unit 5. Both of the first signal conversion unit 4 and the second signal conversion unit 5 receive the rotation speed signal. Besides, both of the first signal conversion unit 4 and the second signal conversion unit 5 are electrically connected to the amplifying driving unit 6. One end of the amplifying driving unit 6 is connected to the first signal conversion unit 4 and the second signal conversion unit 5; the other end of the amplifying driving unit 6 is connected to a transmission unit 7.

The load driving unit 3 comprises a first diode 31, a first resistor 32, a second resistor 33, a third resistor 34, a fourth resistor 35, a fifth resistor 36, a first capacitor 37, and a first transistor 38. One end of the first diode 31 connects the input end 2; the other end of the first diode 31 connects one end of each of the second resistor 33, the fourth resistor 35, and the fifth resistor 36. The other end of the second resistor 33 connects the one end of the first resistor 32 and a source input. The other end of the first resistor 32 connects the third resistor 34 and the first transistor 38. The other end of each of the fourth resistor 35 and the fifth resistor 36 connects the first transistor 38. One end of each of the fifth resistor 36 and the first transistor 38 connects one end of the first capacitor 37 and is grounded. The other end of the first capacitor 37 connects the other end of the third resistor 34 and connects the first signal conversion unit 4 and the second signal conversion unit 5.

The first signal conversion unit 4 comprises a second transistor 41, a second diode 42, and a sixth resistor 43. One end of the second diode 42 connects a source input; the other end of the second diode 42 connects the second transistor 41. One end of the sixth resistor 43 is grounded and the other end of the sixth resistor 43 connects the second transistor 41. The second signal conversion unit 5 comprises a third transistor 51, a third diode 52, a seventh resistor 53, and an eighth resistor 54. One end of the eighth resistor 54 connects a source input; the other end of the eighth resistor 54 connects one end of the third diode 52. The other end of the third diode 52 connects the third transistor 51. The third transistor 51 also connects one end of the seventh resistor 53 and is grounded. The third transistor 51 and the seventh resistor 53 extend to connect the third resistor 34 and the first capacitor 37.

The amplifying driving unit 6 comprises a ninth resistor 61, a tenth resistor 62, an eleventh resistor 63, and an amplifying component 64. One end of the ninth resistor 61 connects the sixth resistor 43 and the second transistor 41; the other end of the ninth resistor 61 connects the amplifying component 64. One end of the tenth resistor 62 connects the third diode 52; the other end of the tenth resistor 62 connects the amplifying component 64. One end of the eleventh resistor 63 connects the amplifying component 64 and a source input; the other end of the eleventh resistor 63 connects the transmission unit 7. The transmission unit 7 comprises a twelfth resistor 71, a fourth transistor 72, and a thirteenth resistor 73. One end of the twelfth resistor 71 connects the amplifying component 64 and the eleventh resistor 63; the other end of the twelfth resistor 71 connects the fourth transistor 72. One end of the thirteenth resistor 73 connects the fourth transistor 72; the other end of the thirteenth resistor 73 connects an output end 8. In this way, the rotation speed signal of the input end 2 is passed through the load driving unit 3, the first signal conversion unit 4, the second signal conversion unit 5, and the amplifying driving unit 6 and is transmitted to the transmission unit 7 which then generates the operation signal to the output end 8 such that the signal control system 1 for the fan motor receives and converts the rotation speed signal to the operation signal, achieving the effects of cost reduction, simplification, and convenience.

In summary, when the signal control system for a fan motor of the present invention is in operation, it really achieves the above-mentioned effects and objective. Thus, the present invention is indeed novel, useful, and non-obvious to be patentable. Please examine the application carefully and grant it as a formal patent for protecting the rights of the inventor.

What is claimed is:

1. A signal control system for a fan motor, comprising:
   an input end used for input of a rotation speed signal;
   a load driving unit electrically connected to the input end and receiving the rotation speed signal;
   a first signal conversion unit electrically connected to the load driving unit and receiving the rotation speed signal;
   a second signal conversion unit electrically connected to the load driving unit and receiving the rotation speed signal; and
   an amplifying driving unit electrically connected to the first signal conversion unit and the second signal conversion unit to generate an operation signal.

2. The signal control system for the fan motor according to claim 1, wherein the load driving unit comprises a first diode, a first resistor, a second resistor, a third resistor, a fourth resistor, a fifth resistor, a first capacitor, and a first transistor, wherein one end of the first diode connects the input end, wherein the other end of the first diode connects one end of each of the second resistor, the fourth resistor, and the fifth resistor, wherein the other end of the second resistor connects the one end of the first resistor, wherein the other end of the first resistor connects the third resistor and the first transistor.

3. The signal control system for the fan motor according to claim 2, wherein the other end of the fourth resistor connects the first transistor, wherein the other end of the fifth resistor connects the first transistor and the first capacitor, wherein the other end of the first capacitor connects the other end of the third resistor.

4. The signal control system for the fan motor according to claim 1, wherein the first signal conversion unit comprises a second transistor, a second diode, and a sixth resistor, wherein one end of each of the second diode and the sixth resistor connects the second transistor.

5. The signal control system for the fan motor according to claim 4, wherein the second signal conversion unit comprises a third transistor, a third diode, a seventh resistor, and an eighth resistor, wherein the one end of each of the third diode and the seventh resistor connects the third transistor, wherein the other end of the third diode connects the eighth resistor.

6. The signal control system for the fan motor according to claim 5, wherein the amplifying driving unit comprises a ninth resistor, a tenth resistor, an eleventh resistor, and an amplifying component, wherein one end of the ninth resistor connects the sixth resistor and the second transistor, wherein the other end of the ninth resistor connects the amplifying component, wherein one end of the tenth resistor connects the third diode, wherein the other end of the tenth resistor connects the amplifying component, wherein one end of the eleventh resistor connects the amplifying component.

7. The signal control system for the fan motor according to claim 6, further comprising a transmission unit which comprises a twelfth resistor, a fourth transistor, and a thirteenth resistor, wherein one end of the twelfth resistor connects the amplifying component and the eleventh resistor, wherein the other end of the twelfth resistor connects the fourth transistor, wherein one end of the thirteenth resistor connects the fourth transistor, wherein the other end of the thirteenth resistor connects an output end.

\* \* \* \* \*